US009545940B2

(12) United States Patent
Taylor et al.

(10) Patent No.: US 9,545,940 B2
(45) Date of Patent: Jan. 17, 2017

(54) INFANT STROLLER APPARATUS

(71) Applicant: Wonderland Nurserygoods Company Limited, Kwai Chung, N.T. (HK)

(72) Inventors: Andrew J. Taylor, Mohnton, PA (US); Robert E. Haut, Merion Station, PA (US); Curtis M. Hartenstine, Birdsboro, PA (US); Anthony V. Ruggiero, Downington, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 0 days.

(21) Appl. No.: 14/753,039

(22) Filed: Jun. 29, 2015

(65) Prior Publication Data
US 2015/0375766 A1 Dec. 31, 2015

Related U.S. Application Data

(60) Provisional application No. 61/998,509, filed on Jun. 30, 2014.

(51) Int. Cl.
*B62B 7/00* (2006.01)
*B62B 7/14* (2006.01)
(Continued)

(52) U.S. Cl.
CPC ............ *B62B 7/142* (2013.01); *B62B 7/08* (2013.01); *B62B 9/102* (2013.01); *B62B 2202/023* (2013.01); *B62B 2205/20* (2013.01)

(58) Field of Classification Search
CPC ............ B62B 7/06; B62B 7/062; B62B 7/064; B62B 7/08; B62B 7/102
See application file for complete search history.

(56) References Cited

U.S. PATENT DOCUMENTS 6,513,827 B1 * 2/2003 Barenbrug .............. B62B 7/147
280/643
7,267,359 B1 * 9/2007 Yang ........................ B62B 7/08
280/47.34
(Continued)

FOREIGN PATENT DOCUMENTS

WO 2010110831 A1 9/2010

OTHER PUBLICATIONS

The Search Report of the EP Patent Application No. 15174322.6 dated Dec. 11, 2015.

*Primary Examiner* — Erez Gurari
(74) *Attorney, Agent, or Firm* — Baker & McKenzie LLP; David I. Roche

(57) ABSTRACT

An infant stroller apparatus includes a leg segment and a handle segment, a joint structure including a first and a second coupling hub that are respectively affixed with the leg segment and the handle segment and are pivotally connected with each other, a mount portion connected with the joint structure, a latch assembly having an actuation surface and arranged in the two coupling hubs, and a detachable seat having a connector and a release actuator arranged adjacent to each other. The latch assembly is movable between a first and a second position for respectively locking and unlocking the leg segment and the handle segment. The release actuator can push against the actuation surface for driving an unlocking displacement of the latch assembly when the seat is installed on the mount portion.

37 Claims, 14 Drawing Sheets

(51) Int. Cl.
*B62B 9/10* (2006.01)
*B62B 7/08* (2006.01)

(56) References Cited

U.S. PATENT DOCUMENTS

| | | | | |
|---|---|---|---|---|
| 7,401,803 B1* | 7/2008 | Lai | ............................ | B62B 7/08 280/47.38 |
| 8,251,382 B2* | 8/2012 | Chen | ........................ | B62B 7/142 280/47.38 |
| 8,651,502 B2* | 2/2014 | Winterhalter | ......... | B60N 2/2848 280/47.4 |
| 8,657,311 B2* | 2/2014 | Li | ............................ | B62B 9/203 280/47.39 |
| 8,764,048 B1* | 7/2014 | Ahnert | .................... | B62B 9/104 280/47.4 |
| 9,108,659 B2* | 8/2015 | Sparling | ................... | B62B 9/12 |
| 2007/0045975 A1* | 3/2007 | Yang | ......................... | B62B 7/14 280/47.38 |
| 2008/0042383 A1* | 2/2008 | Hu | .......................... | B60B 1/006 280/47.38 |
| 2008/0061533 A1* | 3/2008 | Li | ............................ | B62B 7/08 280/642 |
| 2008/0315562 A1* | 12/2008 | Song | ........................ | B62B 7/08 280/650 |
| 2009/0121455 A1* | 5/2009 | Kretschmer | ............ | B62B 7/062 280/642 |
| 2010/0127480 A1* | 5/2010 | Ahnert | ..................... | B62B 7/08 280/647 |
| 2010/0219616 A1* | 9/2010 | Dotsey | ..................... | B62B 7/08 280/642 |
| 2010/0244408 A1* | 9/2010 | Dean | ......................... | B62B 7/08 280/647 |
| 2010/0259021 A1* | 10/2010 | Ahnert | ..................... | B62B 9/20 280/47.4 |
| 2010/0308550 A1* | 12/2010 | Li | ............................ | B62B 7/08 280/38 |
| 2011/0241395 A1* | 10/2011 | Homan | .................... | B62B 7/105 297/250.1 |
| 2011/0291389 A1* | 12/2011 | Offord | ..................... | B62B 7/062 280/650 |
| 2013/0113185 A1* | 5/2013 | Zehfuss | .................... | B62B 3/02 280/647 |
| 2013/0113188 A1* | 5/2013 | Liao | ......................... | B62B 7/14 280/650 |
| 2013/0257019 A1* | 10/2013 | Eisinger | .................... | B62B 7/06 280/650 |
| 2014/0008895 A1* | 1/2014 | Lee | .......................... | B62B 7/062 280/647 |
| 2014/0183843 A1* | 7/2014 | Iftinca | ....................... | B62B 7/06 280/647 |
| 2014/0339793 A1* | 11/2014 | Xu | ............................ | B62B 7/08 280/650 |
| 2015/0008659 A1* | 1/2015 | Chang | ........................ | B62B 7/08 280/650 |
| 2015/0048599 A1* | 2/2015 | Liu | ........................... | B62B 7/08 280/642 |
| 2015/0151774 A1* | 6/2015 | Liu | ........................... | B62B 7/08 403/103 |
| 2015/0217792 A1* | 8/2015 | Stiba | ........................ | B62B 7/08 280/650 |
| 2015/0217793 A1* | 8/2015 | Fjelland | ................... | B62B 7/08 280/647 |
| 2015/0232114 A1* | 8/2015 | Gillett | ....................... | B62B 7/12 280/30 |
| 2015/0329017 A1* | 11/2015 | Kozinski | .............. | B60N 2/2848 248/188 |
| 2015/0375766 A1* | 12/2015 | Taylor | ....................... | B62B 7/08 280/647 |

* cited by examiner

INFANT STROLLER APPARATUS

CROSS-REFERENCE TO RELATED APPLICATION(S)

This patent application claims priority to U.S. Provisional Patent Application No. 61/998,509 filed on Jun. 30, 2014, the disclosure of which is incorporated herein by reference.

BACKGROUND

1. Field of the Invention

The present invention relates to infant stroller apparatuses.

2. Description of the Related Art

Infant strollers provide a convenient way to transport babies and children. A stroller typically includes a metal frame and linkages joined together. The seat, canopy and basket are usually made from a fabric material and fastened to the metal frame. Moreover, some stroller may have the ability to remove the stroller seat, so that an infant car seat can be installed on the stroller frame.

Most currently available infant stroller apparatuses include mechanisms for collapsing the stroller frame to facilitate its storage and transport. For folding the stroller frame, an actuator on the stroller frame and/or on a seat can be operated to unlock the latching connections between the different tube segments of the stroller frame. However, the conventional mechanisms for folding the stroller frame are complex and not compact.

Therefore, there is a need for an infant stroller apparatus that can be convenient to fold, improves the user's experience and address at least the foregoing issues.

SUMMARY

The present application describes an infant stroller apparatus that can be easy to collapse with or without a seat installed thereon. In one embodiment, the infant stroller apparatus includes a leg segment and a handle segment, a joint structure, a mount portion, a latch assembly and a detachable seat. The joint structure includes a first and a second coupling hub pivotally connected with each other about a rotation axis, the first coupling hub being affixed with the leg segment, and the second coupling hub being affixed with the handle segment. The mount portion is connected with the joint structure. The latch assembly has an actuation surface exposed through the mount portion, the latch assembly being movable between a first position rotationally locking the leg segment and the handle segment in an unfolded state, and a second position unlocking the leg segment with respect to the handle segment. The detachable seat has a connector and a release actuator arranged adjacent to each other, the connector being engaged with the mount portion when the seat is installed in the infant stroller apparatus, wherein the release actuator is movable to push against the actuation surface for driving an unlocking displacement of the latch assembly while the connector is engaged with the mount portion, and the release actuator remains coupled with the seat when the connector is removed from the mount portion.

In another embodiment, the infant stroller apparatus includes a leg segment and a handle segment, a joint structure connecting with the leg segment and the handle segment, a mount portion connected with the joint structure, a latching part, a pushing part, a detachable seat having a connector and a first release actuator, and a second release actuator connected with the mount portion. The joint structure includes a first and a second coupling hub pivotally connected with each other about a rotation axis, the first coupling hub being affixed with the leg segment, and the second coupling hub being affixed with the handle segment. The latching part is arranged in an inner cavity defined at least partially by the first and second coupling hubs, the latching part being movable along the rotation axis between a first position locking the leg segment and the handle segment in the unfolded state, and a second position unlocking the leg segment with respect to the handle segment. The pushing part is arranged axially adjacent to the latching part, the pushing part having an actuation surface exposed through an opening provided in the mount portion. The connector of the detachable seat is engaged with the mount portion and the first release actuator is positioned adjacent to the actuation surface when the seat is installed on the infant stroller apparatus. Each of the first and second release actuators is operable to push against the pushing part for urging the latching part to move from the first position to the second position, and the first release actuator remains coupled with the seat and the second release actuator remains coupled with the mount portion when the seat is removed from the mount portion.

According to yet another embodiment, an infant stroller apparatus includes a leg segment and a handle segment, a joint structure connecting with the leg segment and the handle segment, a mount portion connected with the joint structure, a latch assembly arranged in the joint structure, and a release actuator pivotally connected with the mount portion. The joint structure includes a first and a second coupling hub pivotally connected with each other about a rotation axis, the first coupling hub being affixed with the leg segment, and the second coupling hub being affixed with the handle segment. The mount portion is configured to receive the installation of a detachable seat. The latch assembly is slidable along the rotation axis between a first position locking the leg segment and the handle segment in an unfolded state, and a second position unlocking the leg segment with respect to the handle segment. The release actuator is operable to cause the latch assembly to move from the first position to the second position.

At least one advantage of the infant stroller apparatus includes the ability to provide two release mechanisms respectively on the stroller frame and a detachable seat. The infant stroller apparatus can be folded by using the release mechanism of the stroller frame when no seat is installed thereon, and by using the release mechanism of the seat when the seat is installed on the stroller frame. Accordingly, the infant stroller apparatus can be conveniently collapsed with or without the seat installed thereon.

DETAILED DESCRIPTION OF THE EMBODIMENTS

Figure 1:
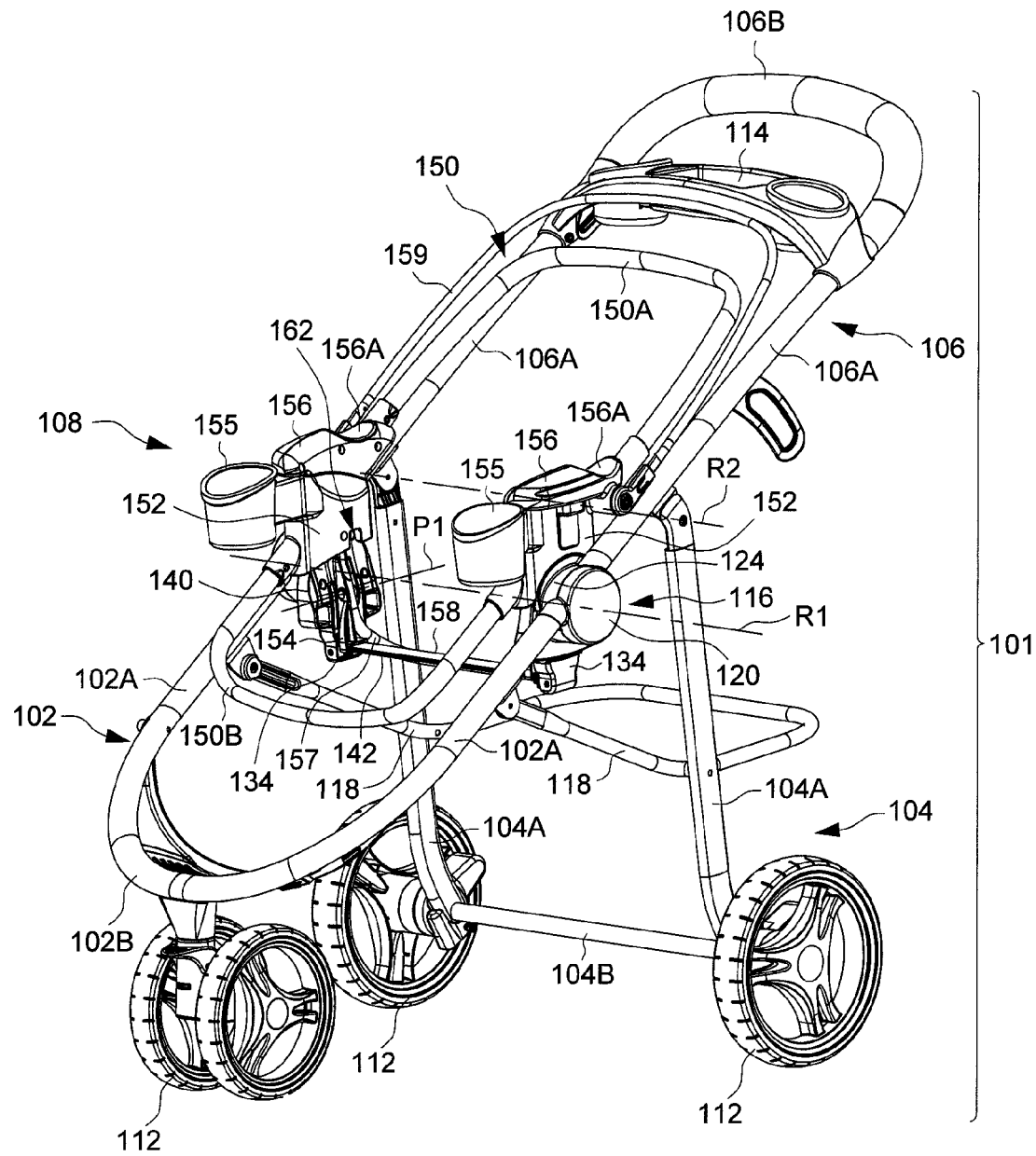
FIG. 1 is a perspective view illustrating an embodiment of an infant stroller apparatus having a detachable seat installed facing forward.
Figure 2:
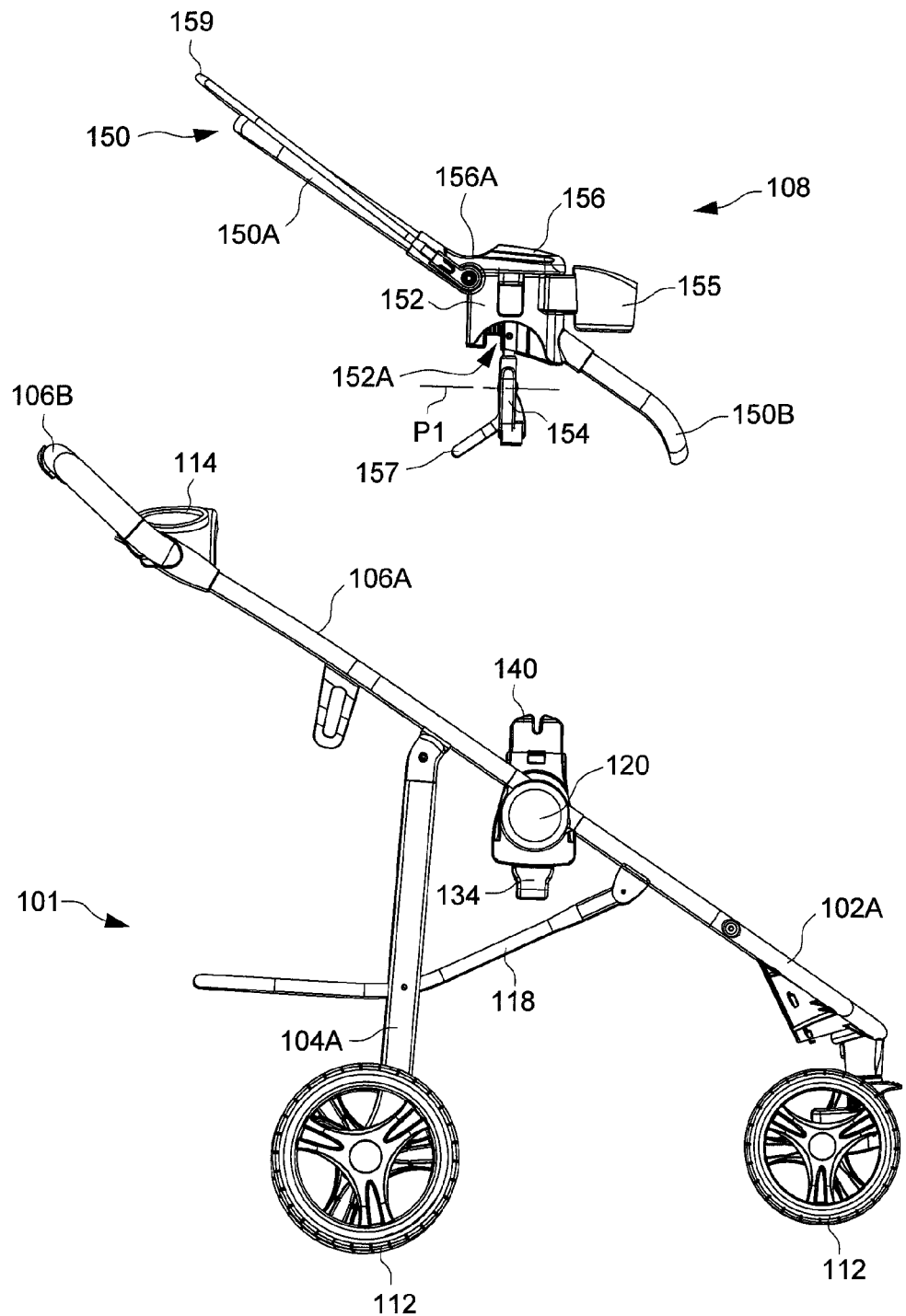
FIG. 2 is a schematic view illustrating the seat detached from a stroller frame of the infant stroller apparatus.

FIGS. 1-4 are various schematic views illustrating an embodiment of an infant stroller apparatus 100. The infant stroller apparatus 100 can include a stroller frame 101 comprised of a front leg frame 102, a rear leg frame 104 and a handle frame 106, and a detachable seat 108 that can be installed on and removed from the stroller frame 101. The front and rear leg frames 102 and 104 of the stroller frame can be respectively formed by the assembly of one or multiple tubular segments. For example, the front leg frame 102 can include two front or first leg segments 102A respectively disposed at a left and a right side of the infant stroller apparatus 100, and a transversal segment 102B connected with the two leg segments 102A. The rear leg frame 104 can include two rear or second leg segments 104A respectively disposed at a left and a right side of the infant stroller apparatus 100, and a transversal segment 104B connected with the two leg segments 104A. The two leg segments 102A of the front leg frame 102 and the two leg segments 104A of the rear leg frame 104 can sideways delimit a central space for arrangement of the seat 108. Lower end portions of the front and rear leg frames 102 and 104 can be respectively provided with wheel assemblies 112.

The handle frame 106 can be formed from the assembly of one or more tubular segments. For example, the handle frame 106 can include two handle segments 106A respectively disposed at a left and a right side of the infant stroller apparatus 100, and a transversal segment 106B connected with the two handle segments 106A. A transversal tray 114 may be connected with the handle segments 106A at an elevated position for the adult's use.

At each of the left and right side of the infant stroller apparatus 100, an upper end portion of the leg segment 102A is pivotally connected with a lower end portion of the handle segment 106A via a joint structure 116 that defines a rotation axis R1, and the upper end portion of the leg segment 104A is pivotally connected with the handle segment 106A about another rotation axis R2 at a location above and behind the rotation axis R1. Accordingly, the handle segment 106A is rotatable relative to the leg segment 102A about the rotation axis R1, and is rotatable relative to the leg segment 104A about the rotation axis R2. Moreover, two side segments 118 can be respectively arranged at the left and right sides of the infant stroller apparatus 100, each side segment 118 being respectively connected pivotally with the leg segments 102A and 104A below the joint structure 116.

The joint structures 116 can pivotally assemble the front leg frame 102 and the handle frame 106, so that the front leg frame 102 and the handle frame 106 can rotate relative to each other to fold or unfold the infant stroller apparatus 100. Moreover, each of the joint structures 116 can be provided with a latch 128 (better shown in FIG. 5) that is operable to lock the front leg frame 102 and the handle frame 106 in a deployed or unfolded state for use. As shown in FIGS. 1-4, in the unfolded state, the leg segments 102A of the front leg frame 102 can extend at an angle from the leg segments 104A of the rear leg frame 104 to provide stable standing, while the handle segments 106A can extend upward and rearward from the joint structures 116.

Figure 4:
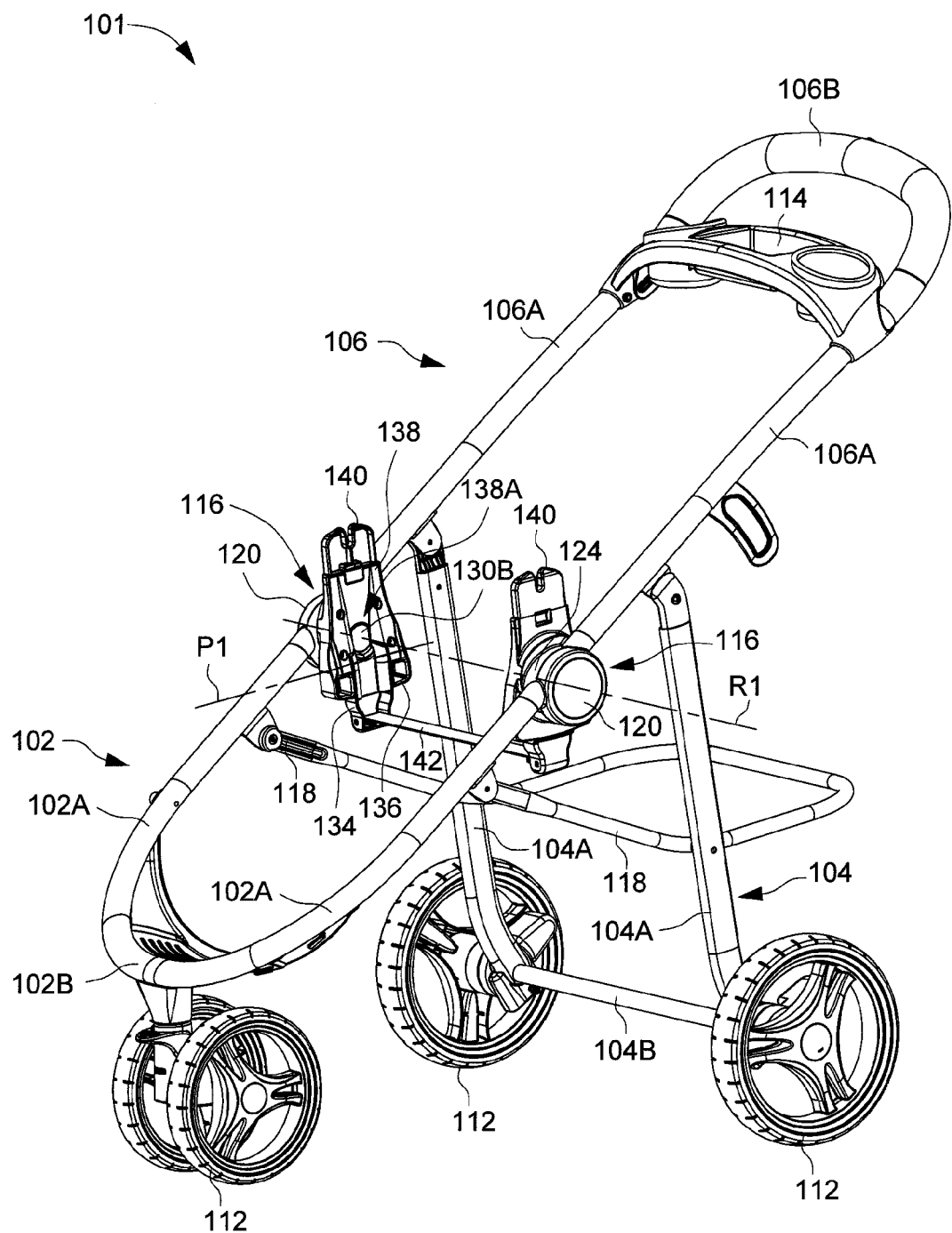
FIG. 4 is a schematic view illustrating a stroller frame of the infant stroller apparatus alone without the detachable seat.
Figure 5:
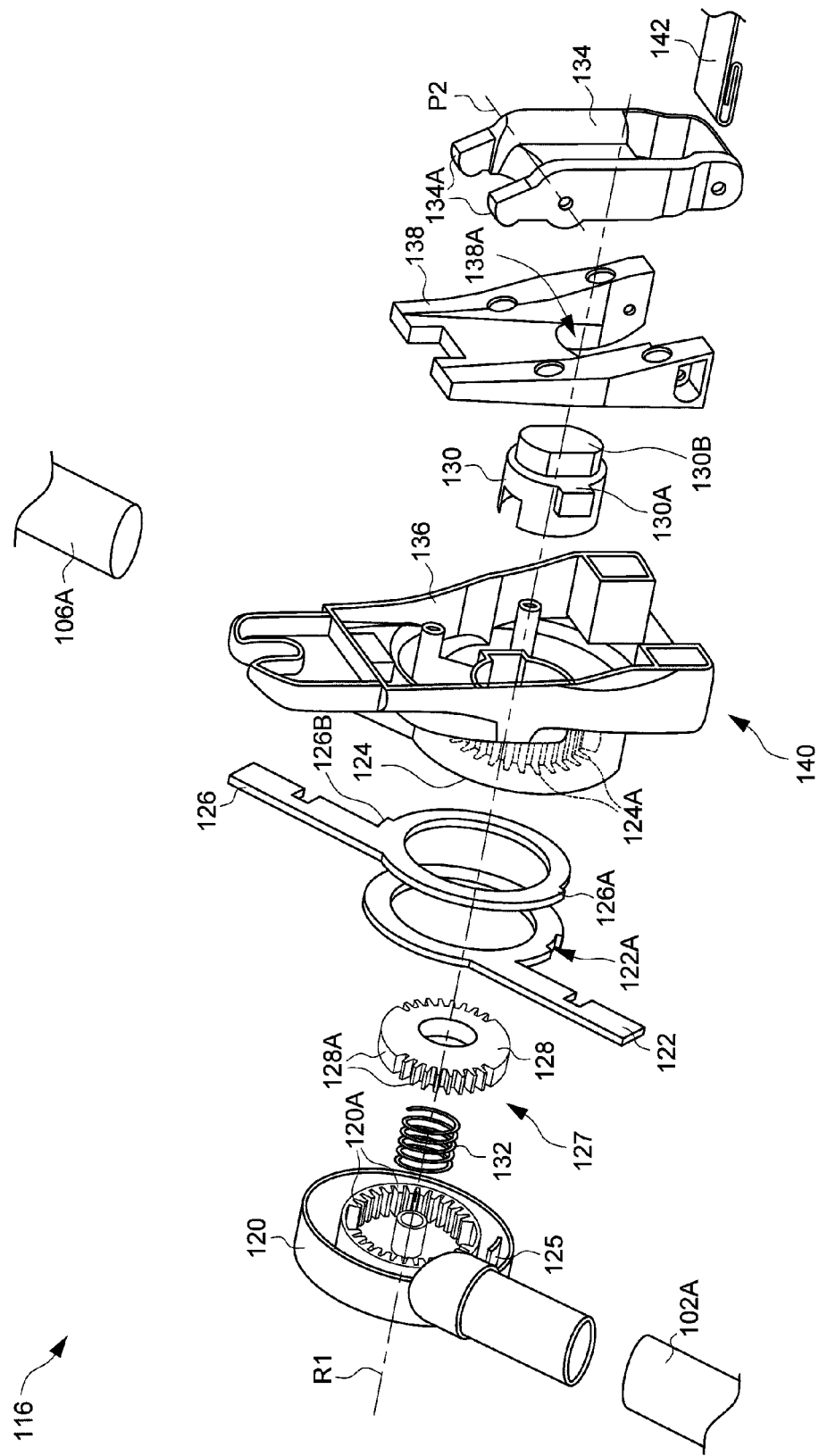
FIG. 5 is an exploded view illustrating a joint structure of the stroller frame.
Figure 6:
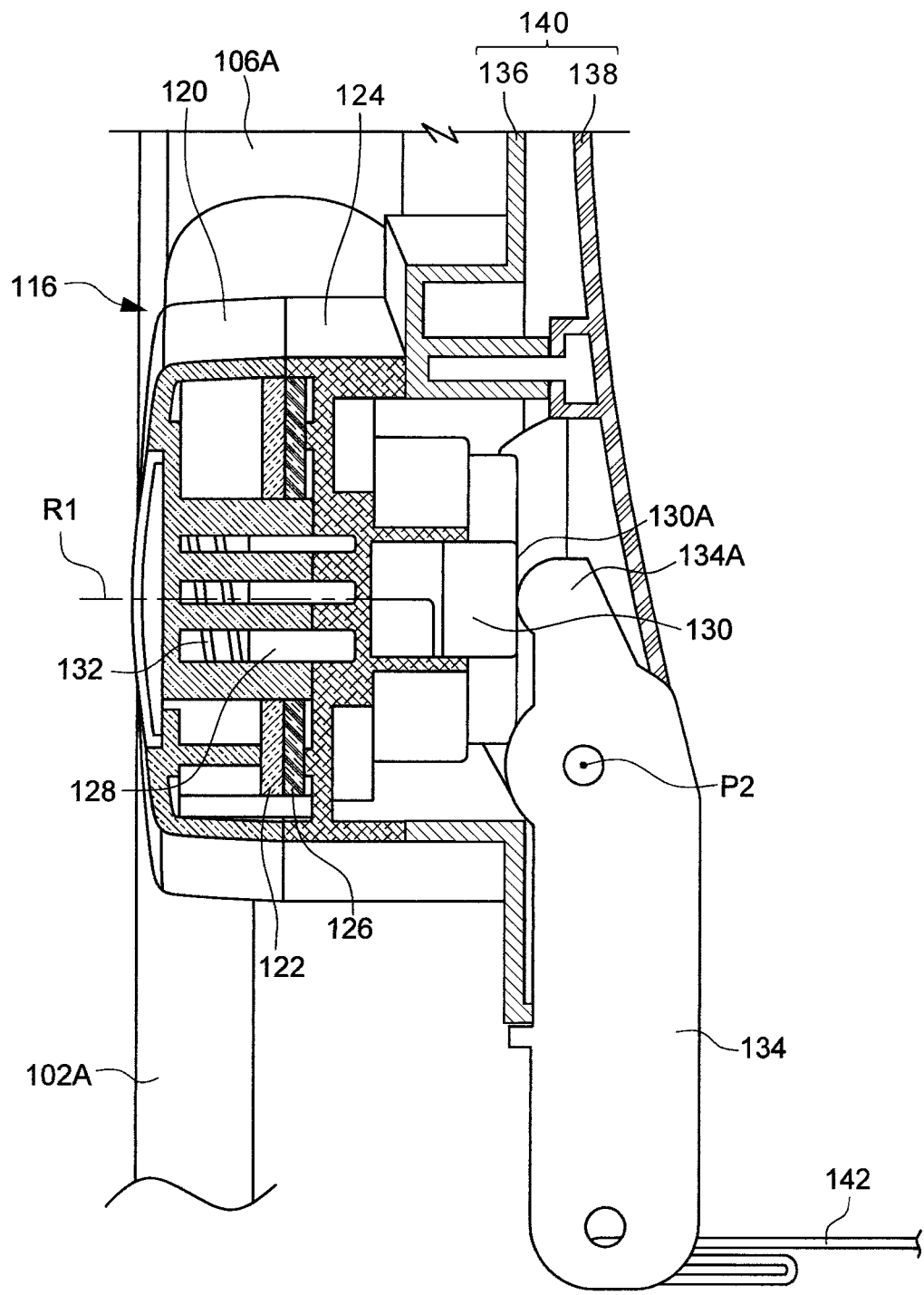
FIG. 6 is a cross-sectional view illustrating the joint structure of FIG. 5 in a locking state.
Figure 7:
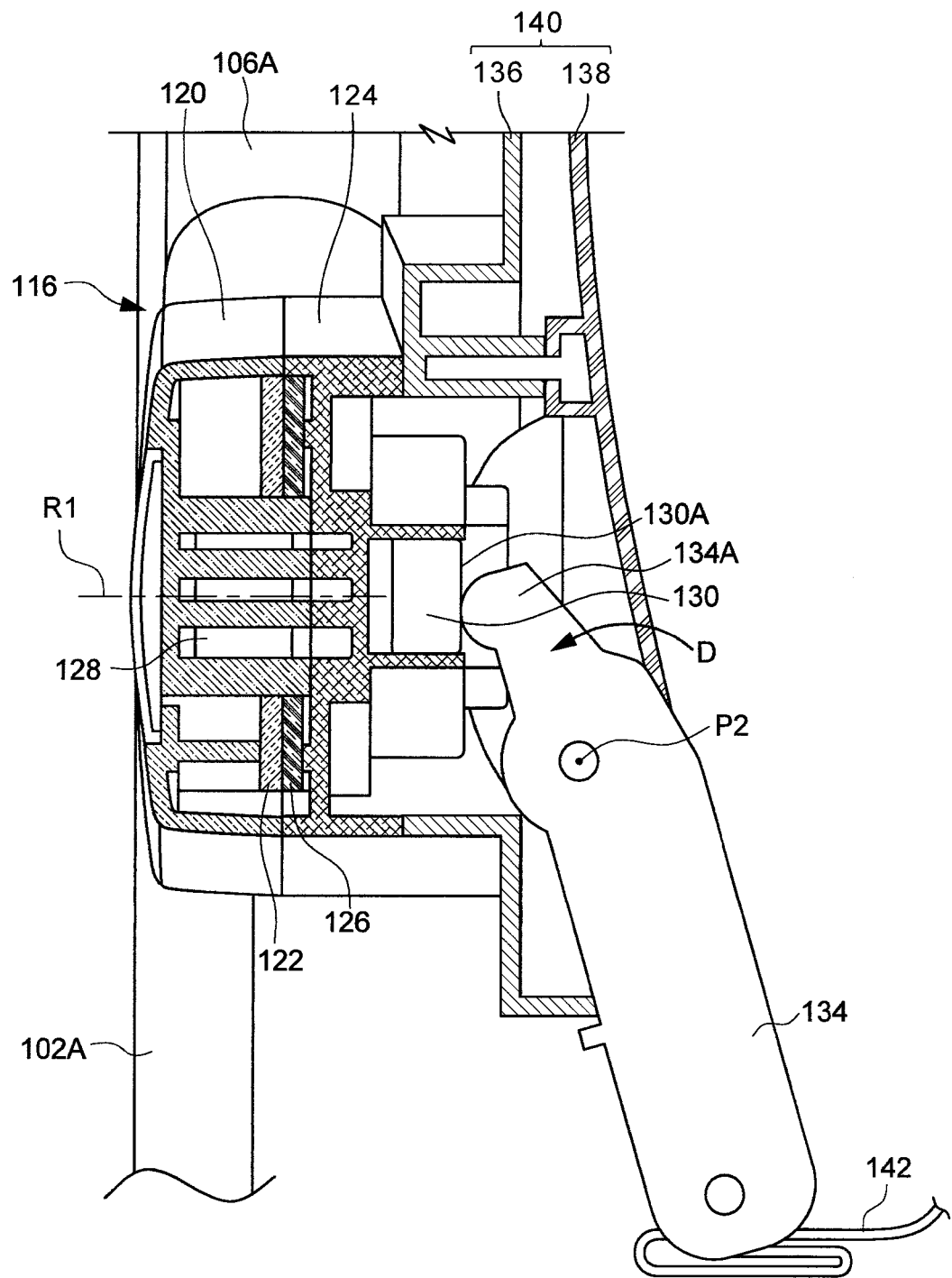
FIG. 7 is a schematic view illustrating the joint structure of FIG. 5 switched to an unlocking state by using a release actuator provided on the stroller frame.

In conjunction with FIG. 4, FIG. 5 is an exploded view illustrating a construction of the joint structure 116, and FIGS. 6 and 7 are schematic cross-sectional views respectively illustrating the joint structure 116 in a locking and unlocking state. The two joint structures 116 provided at the left and right sides can be substantially similar in construction. Referring to FIGS. 4, 5 and 6, each joint structure 116 can include a coupling hub 120 and a frame plate 122 respectively affixed with the leg segment 102A, and a coupling hub 124 and a frame plate 126 respectively affixed with the handle segment 106A. The coupling hubs 120 and 124 can be pivotally connected with each other about the rotation axis R1. In the illustrated embodiment, the coupling hub 124 affixed with the handle segment 106A is disposed at an inner side of the joint structure 116 facing the central space of the stroller frame 101, and the coupling hub 120 affixed with the leg segment 102A is disposed at an outer side turned to the outside of the stroller frame 101. However, in other embodiments, the coupling hub 124 affixed with the handle segment 106A can be disposed at the outer side of the joint structure 116, and the coupling hub 120 affixed with the leg segment 102A can be disposed at the inner side of the joint structure 116. As shown in FIG. 5, the frame plate 126 can include two stop ribs 126A and 126B rotationally spaced apart from each other, the frame plate 122 can include a notch 122A, and the coupling hub 120 can be affixed with a protrusion 125 extending through the notch 122A. The protrusion 125 is limited to travel between the two stop ribs 126A and 126B, which can delimit the angular range of rotation of the front leg frame 102 relative to the handle frame 106.

For rotationally locking and unlocking the leg segment 102A with respect to the handle segment 106A, the joint structure 116 can be provided with a latch assembly 127 comprised of a latching part 128 and a pushing part 130 arranged axially adjacent to each other, a spring 132 and a release actuator 134. The latching assembly 127 and the spring 132 can be placed in an inner cavity defined at least partially by the coupling hubs 120 and 124. The coupling hubs 120 and 124 can respectively have inner cylindrical surfaces respectively formed with a plurality of grooves 120A and 124A that are distributed around the rotation axis R1.

In one embodiment, the coupling hub 124 can be formed as a shell body having a generally rounded shape, and can have an inner cavity in which are arranged the grooves 124A.

A mount portion 140 adapted to detachably engage with the seat 108 is arranged adjacent to the inner side of the joint structure 116, and is affixed with the coupling hub that is placed at the inner side thereof. In the illustrated embodiment, the mount portion 140 is affixed with the coupling hub 124 of the handle segment 106A at the inner side of the joint structure 116. Fasteners can be used to attach the mount portion 140 with the coupling hub 124. One will appreciate, however, that the mount portion 140 may also be formed integrally with the coupling hub 124. The mount portion 140 can be exemplary formed by the assembly of a casing 136 and a cover 138 that define at least partially an inner cavity that communicates with the interior of the coupling hubs 120 and 124. In some variant embodiments, the cover 138 may also be integrally formed with the casing 136 as a single part, which is affixed with the coupling hub 124. When the stroller frame 101 is unfolded for use, the mount portion 140 projects upward above the rotation axis R1 and the joint structure 116, and a lower portion of the mount portion 140 can extend below the coupling hub 124. While the mount portion 140 has been described as being affixed with the coupling hub 124 of the handle segment 106A, one will appreciate that the mount portion 140 may also be affixed with the coupling hub 120 of the leg segment 102A in other embodiments where the coupling hub 120 is disposed at the inner side of the joint structure 116.

The latching part 128 can be assembled for sliding along the rotation axis R1, and can have a plurality of teeth 128A distributed around the rotation axis R1. The latching part 128 is movable between a first and a second position. When it is in the first or locking position (better shown in FIG. 6), the teeth 128A of the latching part 128 respectively engage with the grooves 120A of the coupling hub 120 and the grooves 124A of the coupling hub 124 to rotationally lock the leg segment 102A and the handle segment 106A in an unfolded state. When it is in the second or unlocking position (better shown in FIG. 7), the teeth 128A of the latching part 128 is disengaged from the grooves 124A of the coupling hub 124 to allow a folding rotation of the handle segment 106A relative to the leg segment 102A about the rotation axis R1.

The pushing part 130 is assembled with the coupling hub 124 and the mount portion 140 for sliding along the rotation axis R1, and is placed axially adjacent to the latching part 128. A side of the pushing part 130 can have a flange surface 130A and an actuating surface 130B arranged at different levels, the actuation surface 130B protruding axially from the flange surface 130A and forming an end of the pushing part 130. When the pushing part 130 is assembled with the coupling hub 124, the actuation surface 130B is exposed at the inner side of the joint structure 116 through an opening provided in the mount portion 140 (e.g., through an opening 138A formed through the cover 138), and the flange surface 130A is substantially concealed in the interior of the mount portion 140. In one embodiment, the pushing part 130 may be provided as a separate part (as shown) for facilitating its assembly in the joint structure 116, the pushing part 130 being in mere contact or fixedly connected with the latching part 128. In other embodiments, the pushing part 130 may be formed integrally with the latching part 128.

The spring 132 can be respectively connected with the latching part 128 and an inner sidewall of the coupling hub 120. The spring 132 can bias the latch assembly 127 toward the locking position where the latching part 128 respectively engages with the grooves 120A of the coupling hub 120 and the grooves 124A of the coupling hub 124 for rotationally locking the handle segment 106A and the leg segment 102A in the unfolded state.

The release actuator 134 can be formed as a rigid unitary part, and extend downward below the rotation axis R1. The release actuator 134 is arranged adjacent to the mount portion 140, and is pivotally connected with the mount portion 140 about a pivot axis P2. The pivot axis P2 can extend generally along a side of the stroller frame 101 from a rear toward a front of the stroller frame 101. The release actuator 134 can have an upper portion provided with two spaced-apart prongs 134A that are arranged inside an interior of the mount portion 140 adjacent to the flange surface 130A of the pushing part 130 and at two opposite sides of the actuation surface 130B. The release actuator 134 can further have a lower portion that extends below the mount portion 140.

For facilitating concurrent operation of the two release actuators 134 at the left and right sides of the infant stroller apparatus 100, a flexible operating element 142 extending transversally between the left and right sides of the infant stroller apparatus 100 can have two opposite ends respectively connected with the lower portions of the two release actuators 134. The operating element 142 can exemplary be a strap, a band, a cord, and the like. For facilitating concurrent operation of the release actuators 134, some variant embodiment may also have the two release actuators 134 connected with each other via a rigid operating element, such as a rod extending transversally between the left and right sides of the infant stroller apparatus 100.

It is worth noting that other assemblies may be possible for each release actuator 134. For example, a variant embodiment can have the release actuator 134 slidably assembled with the mount portion 140 and provided with a ramp surface, and the pushing part 130 can be formed with another ramp surface that can interact with the ramp surface of the release actuator 134, whereby a sliding displacement of the release actuator 134 can urge the pushing part 130 and the latching part 128 to move to the unlocking position owing to the interaction of the ramp surfaces.

In still another embodiment, the release actuator 134 may not be arranged adjacent to the flange surface 130A of the pushing part 130. Instead, the release actuator 134 may be connected with a slidable linkage assembly (not shown) having a ramp surface at a side opposite to that of the release actuator 134, and the flange surface 130A of the pushing part 130 may be formed as another ramp surface that can interact with the ramp surface of the linkage assembly. With such construction, a rotation of the release actuator 134 can cause sliding of the linkage assembly, which in turn can urge the pushing part 130 and the latching part 128 to move to the unlocking position owing to the interaction of the ramp surfaces.

Referring to FIGS. 6 and 7, the joint structure 116 is shown in a configuration of use where the seat 108 is not installed on the mount portion 140 of the infant stroller apparatus 100. FIG. 6 illustrates a locking state of the joint structure 116 in which the spring 132 biases the latch assembly 127 to engage with the coupling hub 124 for locking the leg segment 102A and the handle segment 106A in the unfolded state as shown in FIG. 4.

Referring to FIGS. 4 and 7, in case a caregiver wants to fold the stroller frame 101, the operating element 142 can be pulled upward to cause rotation of the release actuator 134 about the pivot axis P2 in a direction D. As a result, the release actuator 134 (in particular the prongs 134A thereof) comes in sliding contact and pushes against the flange surface 130A of the pushing part 130 for urging the pushing part 130 to slide in a direction toward the latching part 128. The latching part 128 is thereby urged by the release actuator 134 to move from the locking position to the unlocking position, which also compresses the spring 132. Accordingly, the operating element 142 and the release actuators 134 of the stroller frame 101 can be operated independently for unlocking the joint structures 116, without the seat 108 installed on the stroller frame 101. When the operating element 142 is released, the spring 132 can urge the latching part 128 and the pushing part 130 to slide reversely and recover their initial positions.

Referring again to FIGS. 1 and 2, the detachable seat 108 can be exemplary a stroller seat specifically configured for use on the stroller frame 101. The seat 108 can include a rigid seat frame 150, two connectors 152 and two release actuators 154. The seat frame 150 can be exemplary formed by a tubular assembly, and can include an upper and a lower frame portion 150A and 150B. At the left and right side of the seat frame 150, the two connectors 152 can be respectively affixed with the upper and lower frame portions 150A and 150B. The upper frame portion 150A can extend rearward and upward from the two connectors 152, and the lower frame portion 150B can extend forward and downward from the two connectors 152.

Each of the connectors 152 can be comprised of a housing having an inner cavity 152A (better shown in FIG. 2) in which one mount portion 140 can be inserted and engaged when the seat 108 is installed on the stroller frame 101. Each connector 152 can have an upper portion affixed with a saddle 156, and a front portion pivotally connected with cup holder 155. The saddle 156 can have a structural feature, such as a recess 156A, that can receive the placement of an infant car seat (as better shown in FIG. 10). Moreover, the two connectors 152 can be affixed with an extending bar 157, which projects downward below the connectors 152 and transversally across the width of the seat 108. The extending bar 157 can provide support for a fabric and a child sitting on the seat 108. Another utility accessory provided in the seat 108 can include a canopy frame 159 that is pivotally connected with the two connectors 152.

The two release actuators 154 are respectively arranged adjacent to the two connectors 152. In one embodiment, each release actuator 154 can be exemplary connected pivotally with the extending bar 157 about a pivot axis P1 at a location below one corresponding connector 152. The pivot axis P1 extends generally along a side of the seat 108 from a rear to a front of the seat 108. To facilitate concurrent operation of the two release actuators 154, the seat 108 can further include a flexible operating element 158 that has two opposite ends respectively connected with the two release actuators 154. The operating element 158 can extend transversally across a width of the seat 108, and can exemplary be a strap, a band, a cord, and the like. For facilitating concurrent operation of the release actuators 154, some variant embodiment may also have the two release actuators 154 connected with each other via a rigid operating element, such as a rod extending transversally between the left and right sides of the seat 108.

Figure 3:
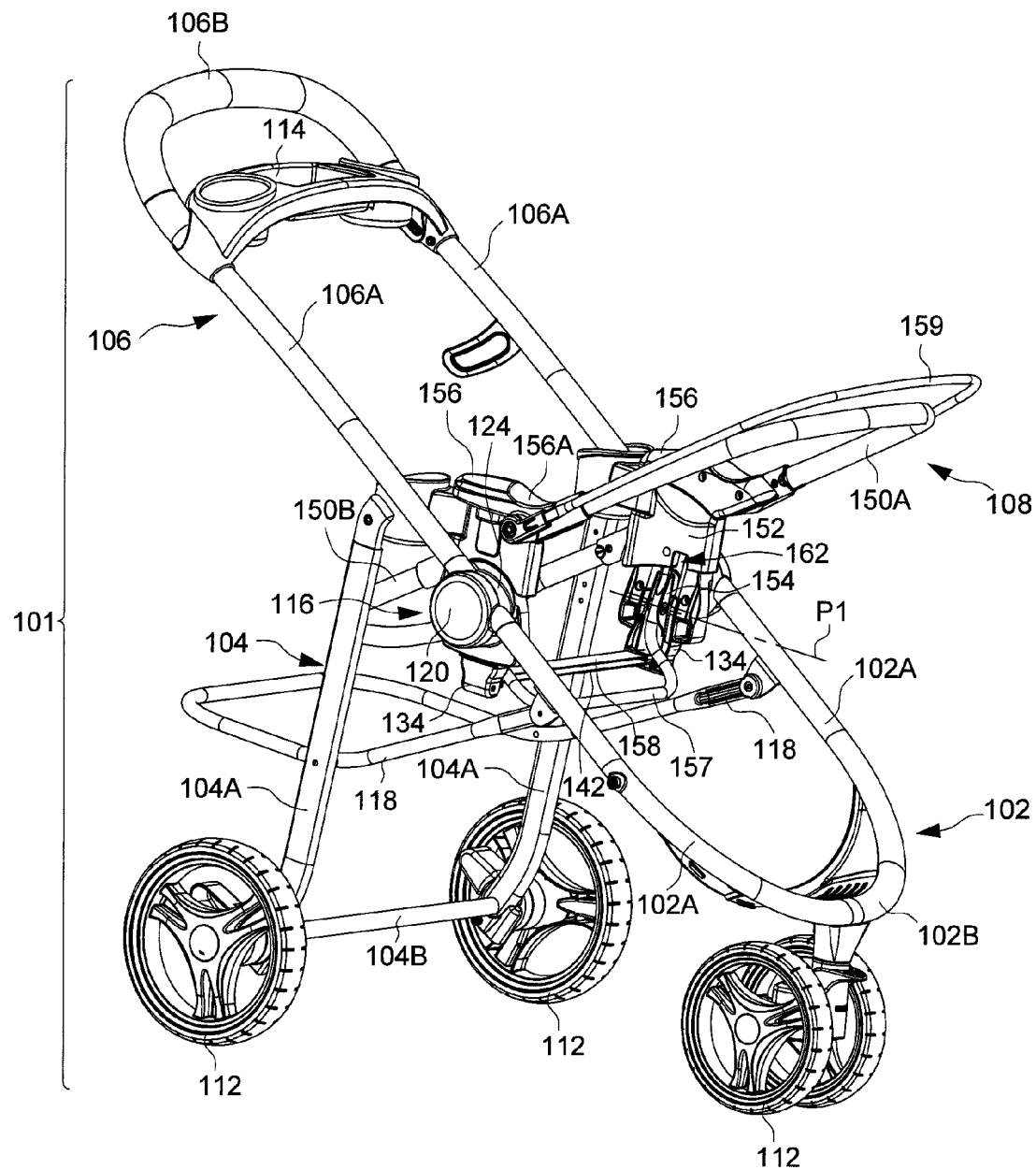
FIG. 3 is a schematic view illustrating the infant stroller apparatus having the detachable seat installed facing rearward.
Figure 8:
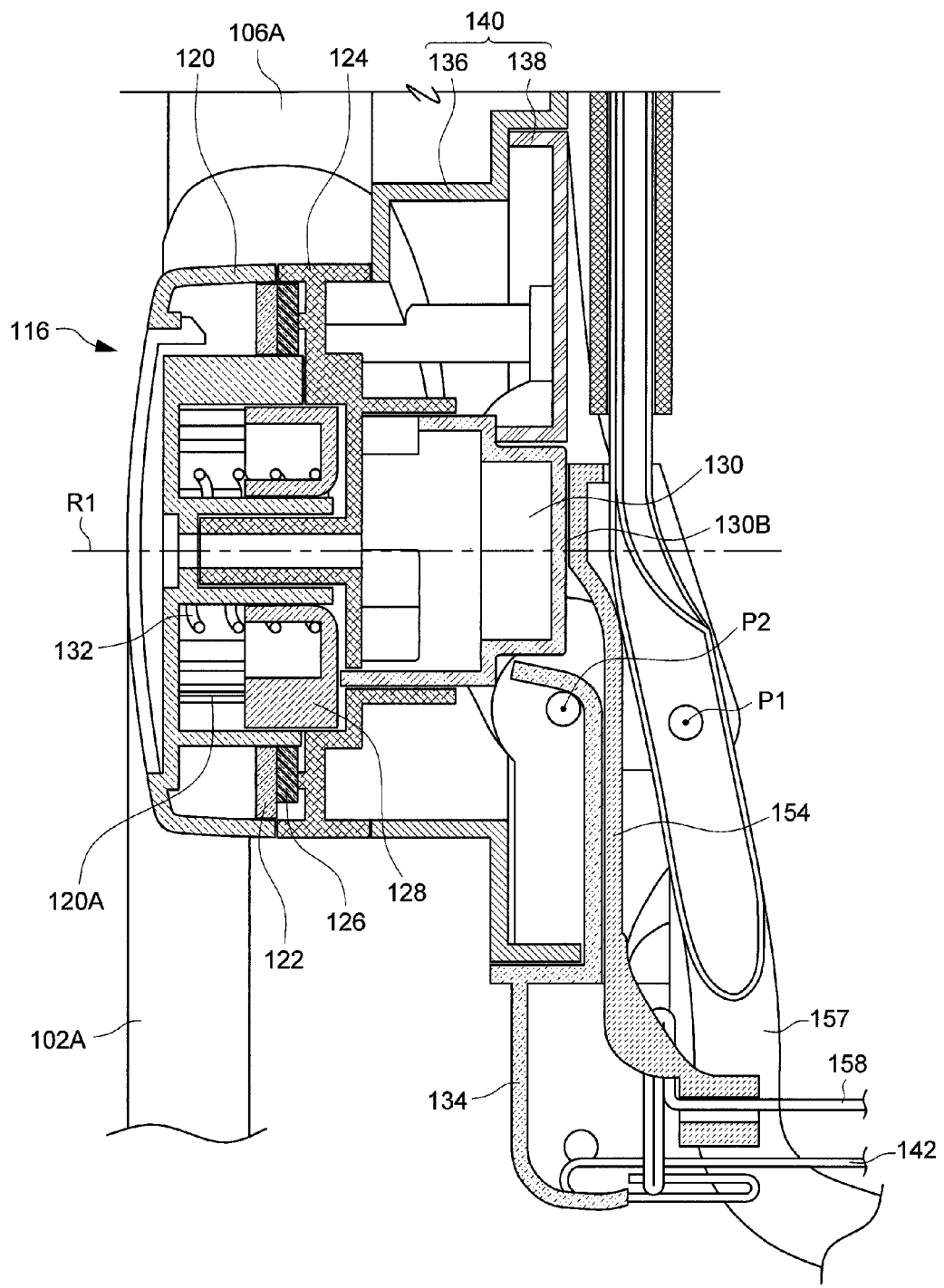
FIG. 8 is a cross-sectional view illustrating the joint structure in a configuration of use where the seat is installed on a mount portion of the stroller frame, the shown joint structure being in a locking state.
Figure 9:
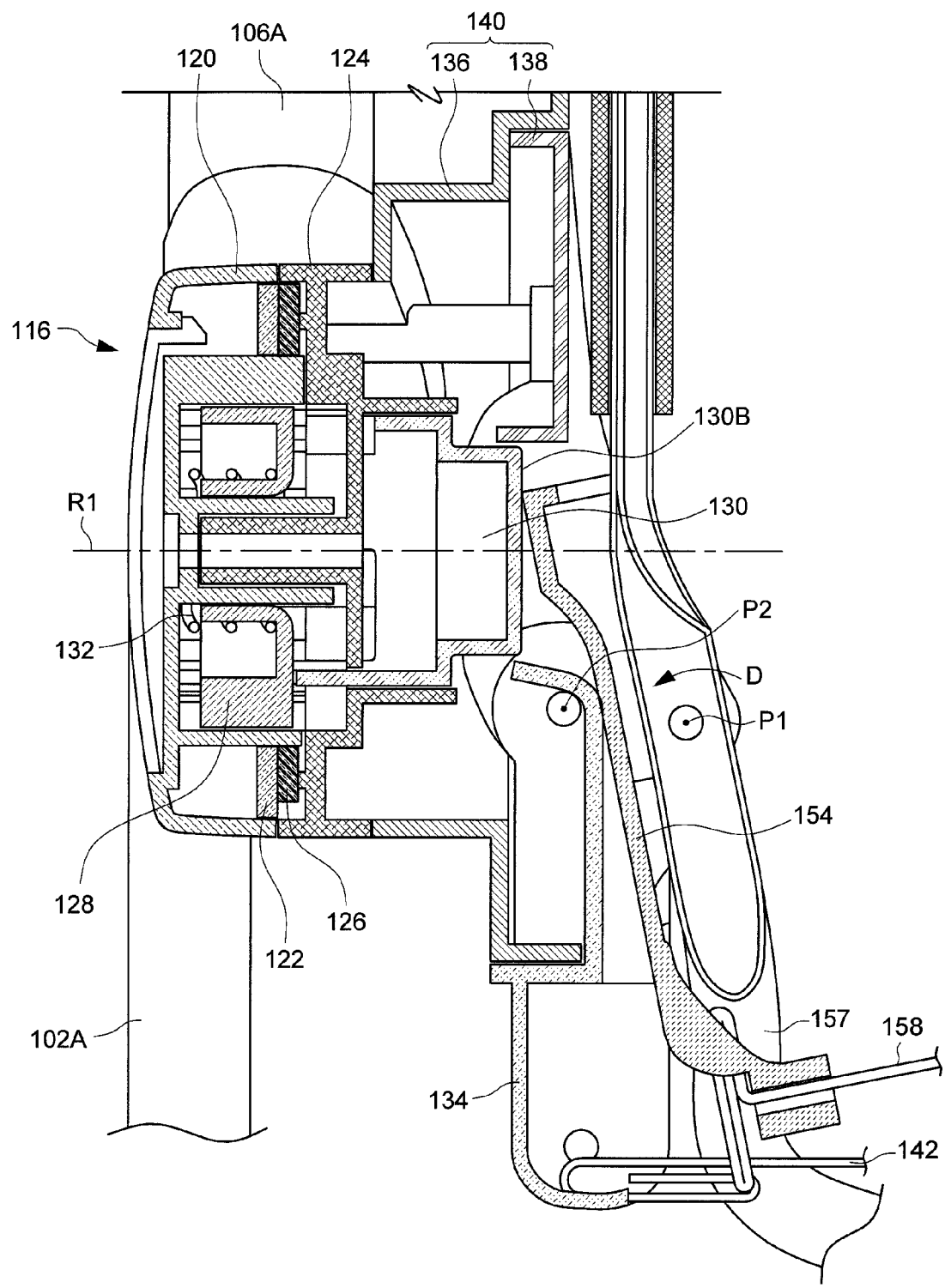
FIG. 9 a cross-sectional view illustrating the joint structure of FIG. 8 switched to an unlocking state by using a release actuator provided on the seat installed on the stroller frame.

In conjunction with FIGS. 1 and 3, FIGS. 8 and 9 are schematic cross-sectional views illustrating the joint structure 116 in a configuration of use where the seat 108 is installed on the mount portion 140 of the stroller frame 101. The representations in FIGS. 8 and 9 are cross-sectional views taken in a plane different from that of FIGS. 6 and 7 to better show the interaction between the release actuator 154 of the seat 108 and the actuation surface 130B of the latch assembly 127 on the stroller frame 101. Referring to FIGS. 1 and 3, the seat 108 can be installed on the stroller frame by having the mount portions 140 respectively engaged with the connectors 152. According to the needs, the seat 108 may be installed facing a front of the stroller frame 101 (as shown in FIG. 1), or a rear of the stroller frame 101 (as shown in FIG. 3). Referring to FIGS. 1, 3 and 8, once the seat 108 is installed on the stroller frame 101, each of the two release actuators 154 is respectively positioned close to the corresponding mount portion 140 and adjacent to the actuation surface 130B of the pushing part 130. Moreover, the release actuators 134 and 154 at each of the left and right sides of the infant stroller apparatus 100 can be located adjacent to each other in vertically overlapping regions, and extend downward below the rotation axis R1 and the mount portion 140. The respective pivot axes P1 and P2 of the release actuators 134 and 154 at each of the left and right sides of the infant stroller apparatus 100 can be substantially parallel to each other and extend generally from a the rear toward the front of the seat 108.

Referring to FIGS. 1 and 9, in case a caregiver wants to fold the infant stroller apparatus 100 with the seat 108 installed thereon, the operating element 158 of the seat 108 can be pulled upward, which causes each release actuator 154 to rotate in the direction D about the corresponding pivot axis P1 and come into sliding contact with the actuation surface 130B of the pushing part 130. As a result, the release actuator 154 can contact and push against the actuation surface 130B to cause displacement of the pushing part 130 along the rotation axis R1 in a direction toward the latching part 128, which in turn pushes the latching part 128 to slide from the locking position to the unlocking position and compress the spring 132. The stroller frame 101 is thereby unlocked, and can be folded with the seat 108 installed thereon. The aforementioned operation of the operating element 158 and the release actuators 154 of the seat 108 is performed independently from the operating element 142 and the release actuators 134 of the stroller frame 101.

When it is unused, the seat 108 can be removed from the stroller frame 101 by disengaging the connectors 152 from the mount portions 140. As the connectors 152 and the seat 108 are detached and removed from the mount portions 140, the release actuators 154 and the operating element 158 remain coupled with the seat 108, whereas the release actuators 134 remain coupled with the mount portions 140.

The embodiments described herein thus provide a release system in which each of the detachable seat 108 and the stroller frame 101 is respectively provided with a separate release actuator operable to trigger unlocking of the joint structures 116 for folding the infant stroller apparatus 100. Accordingly, the infant stroller apparatus 100 can be conveniently folded with or without the seat 108 installed thereon. Moreover, the seat 108 can be installed facing forward or rearward, which does not affect the operation of the release system.

Figure 10:
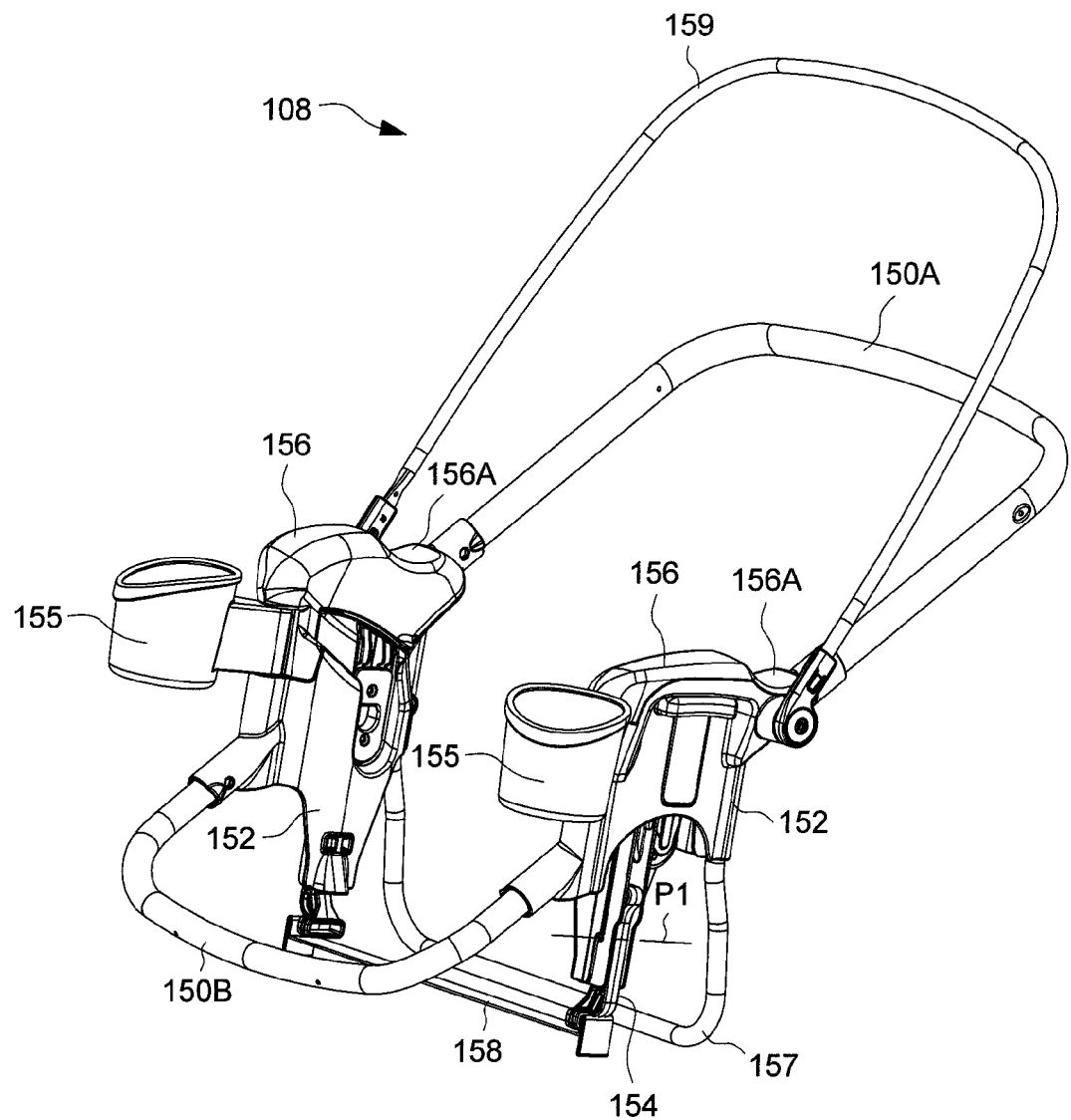
FIG. 10 is a schematic view illustrating a variant embodiment of a detachable seat having a release actuator operable to unlock the joint structure of the infant stroller apparatus for its folding.
Figure 11:
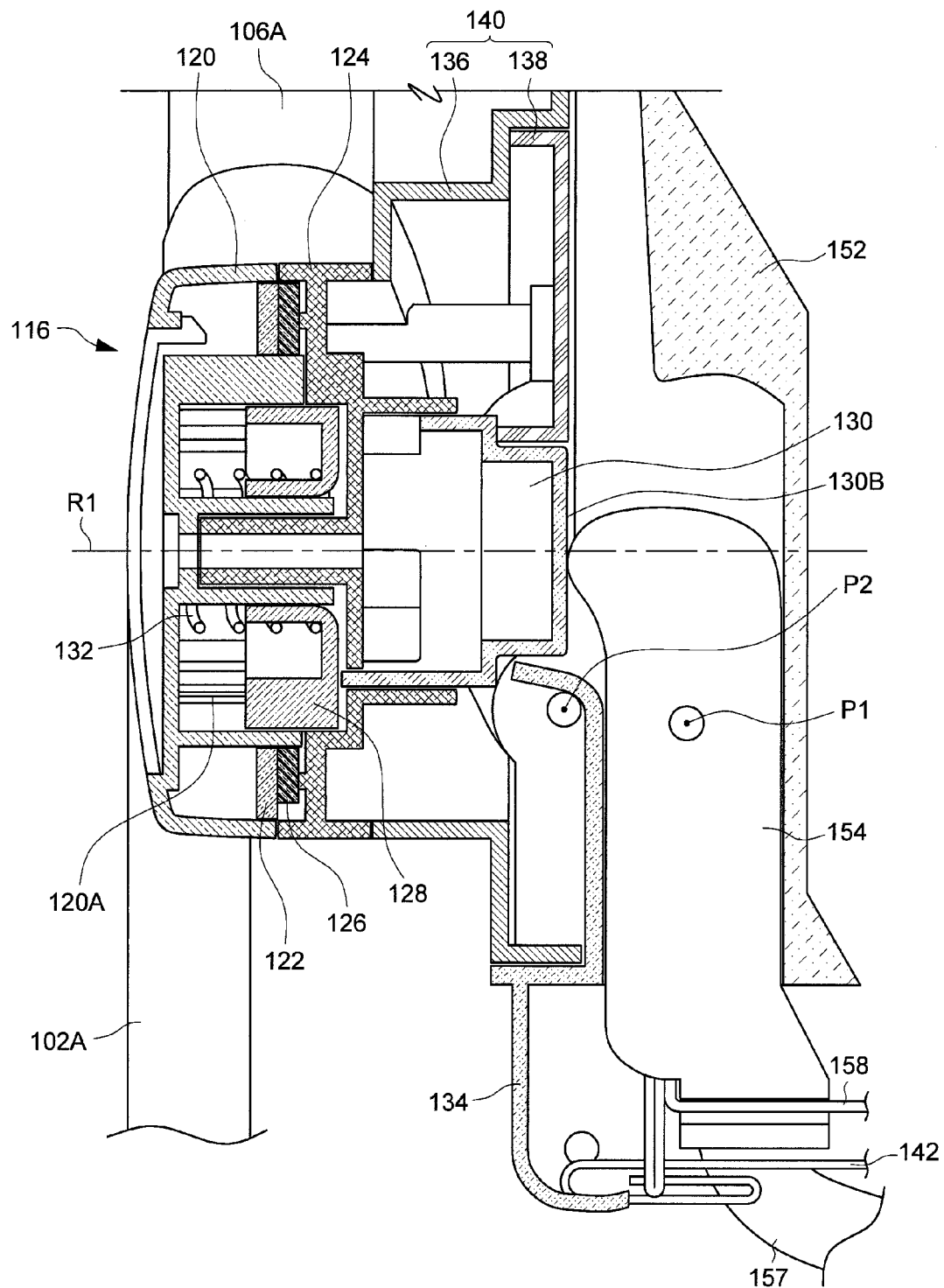
FIG. 11 is a cross-sectional view illustrating the arrangement of the release actuator of the detachable seat shown in FIG. 10 when it is installed on the infant stroller apparatus adjacent to one joint structure thereof.

It is worth noting that the release system described herein is not limited by the way the release actuators 154 are assembled with the seat 108, as long as they are properly positioned adjacent to the connectors 152 for interaction with the actuation surfaces 130B of the latch assemblies 127 on the stroller frame 101. For example, FIGS. 10 and 11 are schematic views illustrating a variant embodiment in which each release actuator 154 of the detachable seat 108 can be pivotally connected with the housing of the corresponding connector 152 about the pivot axis P1, and the extending bar 157 can be affixed with the housing of the connector 152 behind the release actuator 154. Like previously described, the pivot axis P1 of each release actuator 154 shown in the embodiment of FIG. 10 can extend generally along a side of the seat 108 from a rear toward a front thereof. The operation of the release actuators 154 shown in FIGS. 10 and 11 is similar to that of the embodiment described previously with reference to FIGS. 1-9. Referring to FIG. 11, when the seat 108 shown in FIG. 10 is installed on the stroller frame, each release actuator 154 is respectively positioned close to the corresponding mount portion 140 and adjacent to the actuation surface 130B of the pushing part 130. Moreover, the release actuators 134 and 154 can be located adjacent to each other in vertically overlapping regions, and extend downward below the rotation axis R1 and the mount portion 140. When a caregiver wants to fold the infant stroller apparatus with the seat 108 installed thereon, the operating element 158 of the seat 108 can be pulled upward, which causes each release actuator 154 to rotate about the corresponding pivot axis P1 and push against the actuation surface 130B of the pushing part 130. As a result, the pushing part 130 and the latching part 128 can slide along the rotation axis R1 from the locking position to the unlocking position for unlocking the stroller frame.

Figure 12:
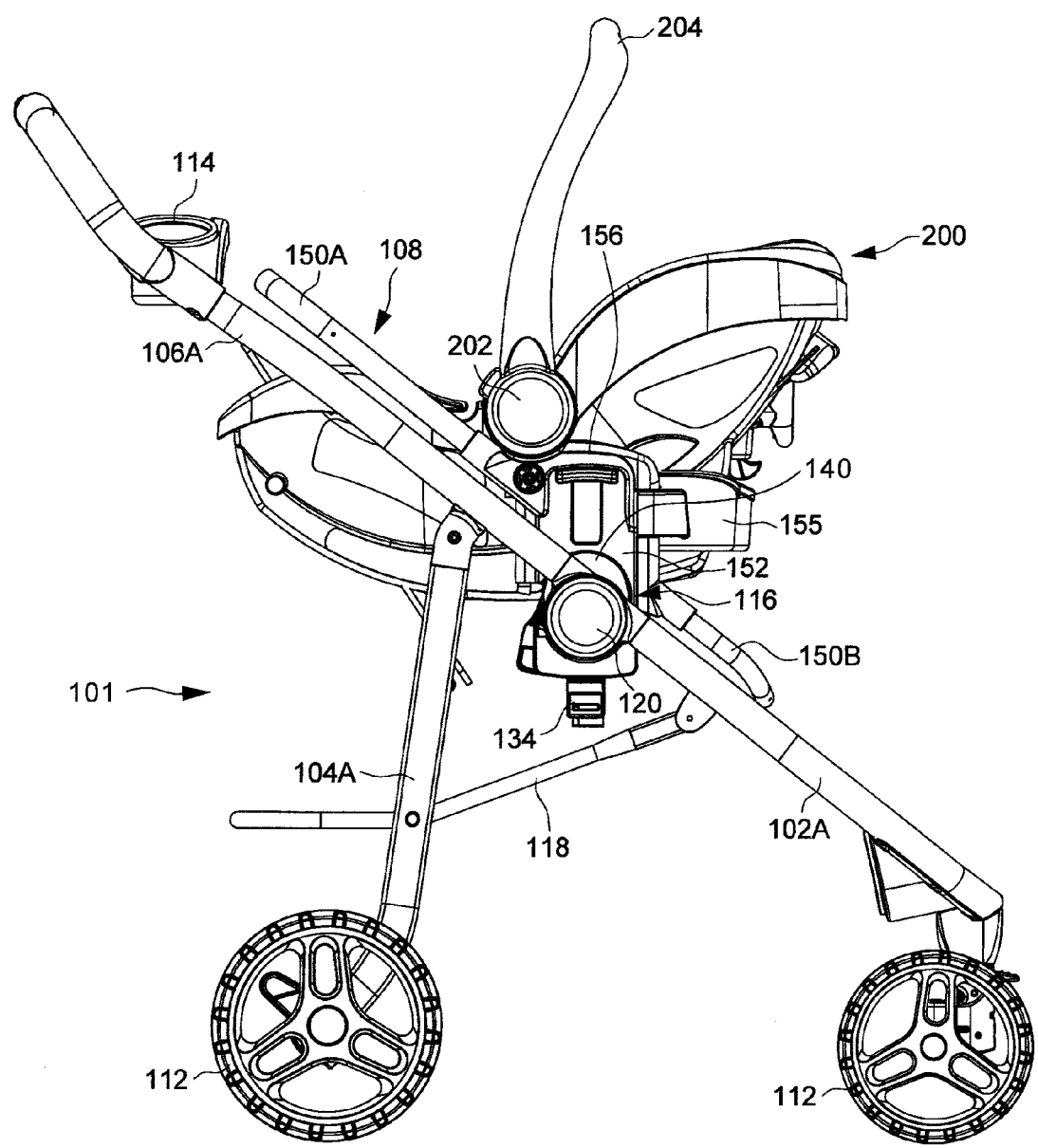
FIG. 12 is a schematic view illustrating the infant stroller apparatus with a detachable stroller seat and an infant car seat installed thereon.

In conjunction with FIGS. 1-11, FIGS. 12-14 are schematic views illustrating the infant stroller apparatus 100 in multiple different configurations of use. In FIG. 12, the infant stroller apparatus 100 is shown in a first configuration with the seat 108 installed thereon facing forward. In this configuration, an infant car seat 200 can be placed on the seat 108. In particular, the infant car seat 200 may be arranged such that two pivotal hubs 202 that connect with a carrying handle 204 of the infant car seat 200 are supported on the saddles 156 (in particular at the recesses 156A thereof) of the seat 108. Moreover, the infant car seat 200 may include two latches (not shown) that can protrude at the left and right side thereof to engage with slots 162 (better shown in FIG. 1) provided on the two connectors 152.

Figure 13:
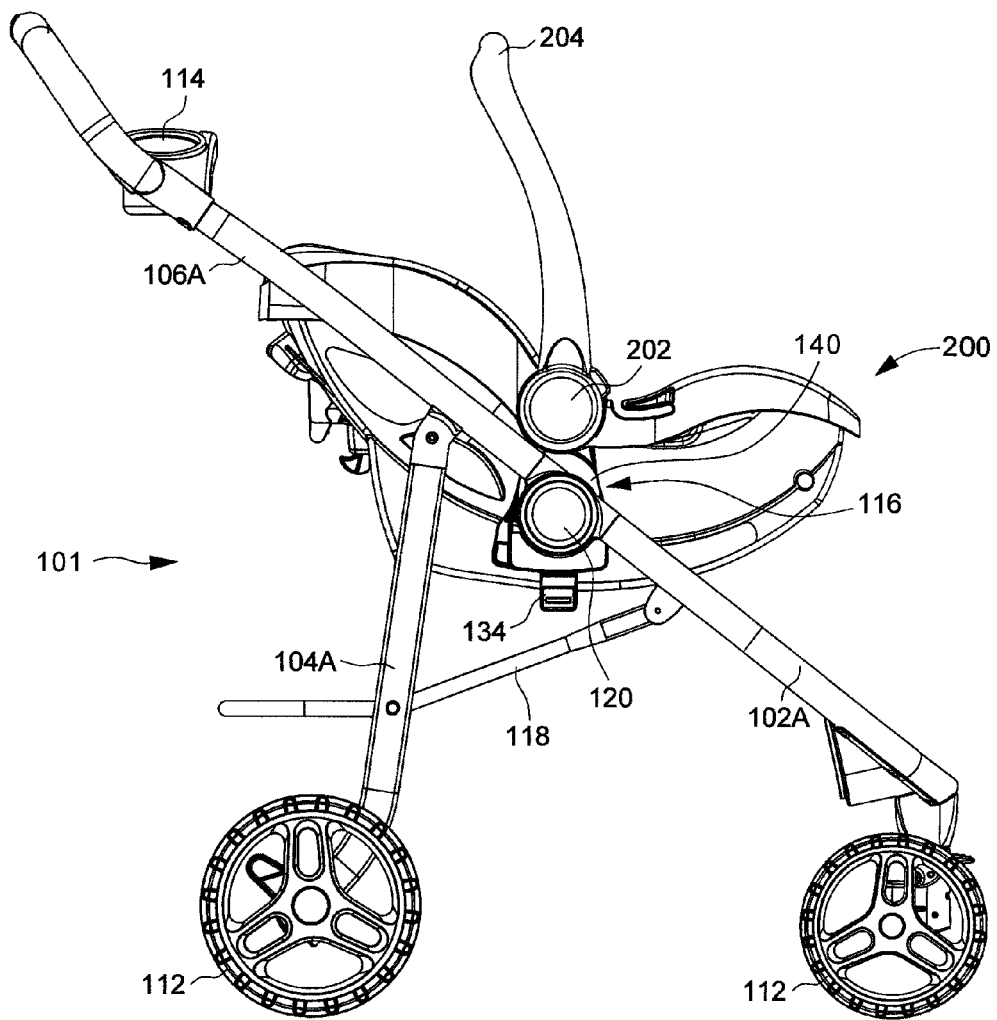
FIG. 13 is a schematic view illustrating the infant stroller apparatus without the detachable stroller seat and having an infant car seat installed facing forward on the stroller frame.

In FIG. 13, the infant stroller apparatus 100 is shown in a second configuration without the seat 108, and the infant car seat 200 is installed on the mount portions 140 (better shown in FIG. 4) of the stroller frame 101 facing forward. The mount portions 140 of the stroller frame 101 can directly insert into receiving slots provided in the infant car seat 200 adjacent to the pivotal hubs 202.

Figure 14:
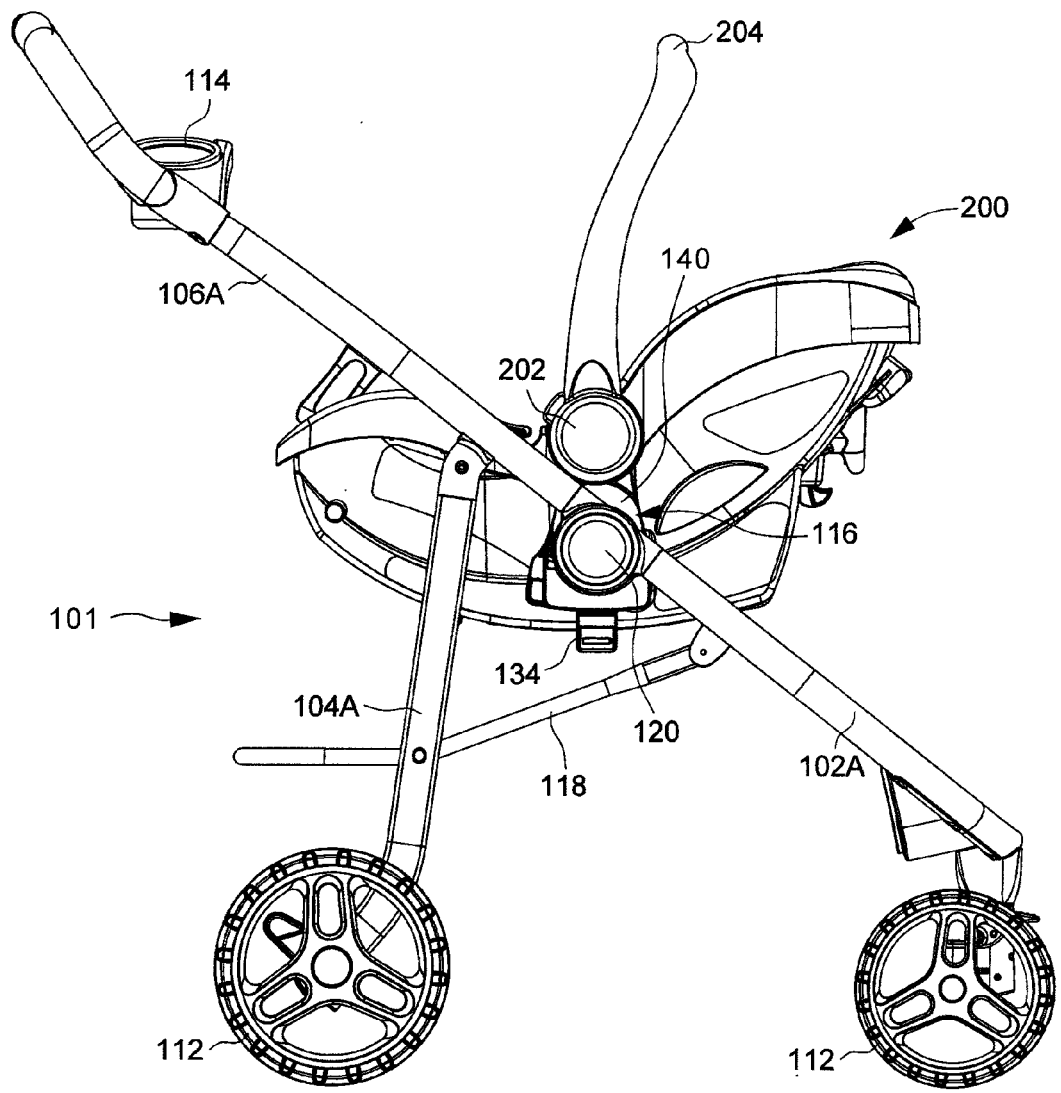
FIG. 14 is a schematic view illustrating the infant stroller apparatus without the detachable stroller seat and having an infant car seat installed facing rearward on the stroller frame.

In FIG. 14, the infant stroller apparatus 100 is shown in a third configuration without the seat 108, and the infant car seat 200 is installed on the stroller frame 101 facing rearward.

Advantages of the infant stroller apparatus described herein include the ability to provide two release mechanisms respectively on the stroller frame and a detachable seat. The infant stroller apparatus can be folded by using the release mechanism of the stroller frame when no seat is installed thereon, and by using the release mechanism of the seat when the seat is installed on the stroller frame. Accordingly, the infant stroller apparatus can be conveniently collapsed with or without the seat installed thereon.

Realization of the infant stroller apparatus has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. An infant stroller apparatus comprising:
   a leg segment and a handle segment;
   a joint structure including a first and a second coupling hub pivotally connected with each other about a rotation axis, the first coupling hub being affixed with the leg segment, and the second coupling hub being affixed with the handle segment;
   a mount portion connected with the joint structure;
   a latch assembly having an actuation surface exposed through the mount portion, the latch assembly being movable between a first position rotationally locking the leg segment and the handle segment in an unfolded state, and a second position unlocking the leg segment with respect to the handle segment; and
   a detachable seat having a connector and a release actuator arranged adjacent to each other, the connector being engaged with the mount portion when the seat is installed on the infant stroller apparatus, wherein the release actuator is movable to push against the actuation surface for driving an unlocking displacement of the latch assembly while the connector is engaged with the mount portion, and the release actuator remains coupled with the seat when the connector is removed from the mount portion.

2. The infant stroller apparatus according to claim 1, wherein the mount portion is affixed with the second coupling hub.

3. The infant stroller apparatus according to claim 1, wherein the latch assembly is arranged in an inner cavity defined at least partially by the first and second coupling hubs.

4. The infant stroller apparatus according to claim 1, wherein the release actuator is pivotally connected with the seat about a pivot axis that extends generally along a side of the seat from a rear toward a front thereof.

5. The infant stroller apparatus according to claim 1, wherein the connector is affixed with an extending bar projecting downward, and the release actuator is pivotally connected with the extending bar at a location below the connector.

6. The infant stroller apparatus according to claim 1, wherein the release actuator is pivotally connected with a housing of the connector.

7. The infant stroller apparatus according to claim 1, wherein the release actuator of the seat extends below the rotation axis when the seat is installed on the mount portion.

8. The infant stroller apparatus according to claim 1, wherein the actuation surface is exposed through an opening provided in the mount portion.

9. The infant stroller apparatus according to claim 1, wherein the latch assembly is slidable along the rotation axis between the first and second position, the latch assembly being engaged with the second coupling hub in the first position and disengaged from the second coupling hub in the second position.

10. The infant stroller apparatus according to claim 9, further including a spring biasing the latch assembly toward the first position for engaging with the second coupling hub.

11. The infant stroller apparatus according to claim 9, wherein the latch assembly includes a latching part and a pushing part placed axially adjacent to each other, the pushing part and the latching part being arranged for sliding along the rotation axis, the actuation surface being provided at an end of the pushing part.

12. The infant stroller apparatus according to claim 11, further including a second release actuator arranged adjacent to the mount portion, the second release actuator being operable to push against the pushing part for urging the latching part to move from the first position to the second position.

13. The infant stroller apparatus according to claim 12, wherein the second release actuator contacts with a flange surface of the pushing part that is concealed in an interior of the mount portion.

14. The infant stroller apparatus according to claim 12, wherein the release actuator is pivotally connected with the seat, and the second release actuator is pivotally connected with the mount portion.

15. The infant stroller apparatus according to claim 12, wherein the two release actuators are located in vertically overlapping regions when the connector is engaged with the mount portion.

16. The infant stroller apparatus according to claim 1, wherein the release actuator is connected with an operating element extending transversally relative to the seat.

17. The infant stroller apparatus according to claim 1, further including a second leg segment pivotally connected with the handle segment at a location above the rotation axis.

18. The infant stroller apparatus according to claim 1, wherein the seat is installable on the mount portion facing a front of the infant stroller apparatus, or facing a rear of the infant stroller apparatus.

19. The infant stroller apparatus according to claim 1, wherein the connector is upwardly connected with a saddle configured to receive and support an infant car seat.

20. An infant stroller apparatus comprising:
a leg segment and a handle segment;
a joint structure including a first and a second coupling hub pivotally connected with each other about a rotation axis, the first coupling hub being affixed with the leg segment, and the second coupling hub being affixed with the handle segment;
a mount portion connected with the joint structure;
a latching part arranged in an inner cavity defined at least partially by the first and second coupling hubs, the latching part being movable along the rotation axis between a first position locking the leg segment and the handle segment in an unfolded state, and a second position unlocking the leg segment with respect to the handle segment;
a pushing part arranged axially adjacent to the latching part, the pushing part having an actuation surface exposed through an opening provided in the mount portion;
a detachable seat having a connector and a first release actuator, wherein the connector is engaged with the mount portion and the first release actuator is positioned adjacent to the actuation surface when the seat is installed on the infant stroller apparatus; and
a second release actuator connected with the mount portion;
wherein each of the first and second release actuators is operable to push against the pushing part for urging the latching part to move from the first position to the second position, and the first release actuator remains coupled with the seat and the second release actuator remains coupled with the mount portion when the seat is removed from the mount portion.

21. The infant stroller apparatus according to claim 20, wherein the first and second release actuators are operable independent from each other.

22. The infant stroller apparatus according to claim 20, wherein the mount portion is affixed with the second coupling hub.

23. The infant stroller apparatus according to claim 20, wherein the mount portion extends above the rotation axis, and the first and second release actuators extend below the rotation axis.

24. The infant stroller apparatus according to claim 20, wherein the second release actuator contacts with a flange surface of the pushing part that is concealed in an interior of the mount portion.

25. The infant stroller apparatus according to claim 20, wherein the latching part and the pushing part are slidable along the rotation axis, the latching part being engaged with the second coupling hub in the first position and disengaged from the second coupling hub in the second position.

26. The infant stroller apparatus according to claim 25, further including a spring biasing the latching part toward the first position for engaging with the second coupling hub.

27. The infant stroller apparatus according to claim 20, wherein the first release actuator is pivotally connected with the seat about a first pivot axis, and the second release actuator is pivotally connected with the mount portion about a second pivot axis spaced apart from the first pivot axis.

28. The infant stroller apparatus according to claim 27, wherein the first and second pivot axes are substantially parallel to each other and extend generally from a rear toward a front of the infant stroller apparatus.

29. The infant stroller apparatus according to claim 20, wherein the first and second release actuators are respectively connected with a first and a second operating element extending transversally.

30. The infant stroller apparatus according to claim 20, further including a second leg segment pivotally connected with the handle segment at a location above the rotation axis.

31. The infant stroller apparatus according to claim 20, wherein the two release actuators are located in vertically overlapping regions when the connector is engaged with the mount portion.

32. The infant stroller apparatus according to claim 20, wherein the connector is upwardly connected with a saddle configured to receive and support an infant car seat.

33. An infant stroller apparatus comprising:
a leg segment and a handle segment;
a joint structure including a first and a second coupling hub pivotally connected with each other about a rotation axis, the first coupling hub being affixed with the leg segment, and the second coupling hub being affixed with the handle segment;
a mount portion connected with the joint structure, the mount portion being configured to receive the installation of a detachable seat;
a latch assembly arranged in the joint structure, the latch assembly being slidable along the rotation axis between a first position locking the leg segment and the handle segment in an unfolded state, and a second position unlocking the leg segment with respect to the handle segment; and
a release actuator pivotally connected with the mount portion, the release actuator being operable to cause the latch assembly to move from the first position to the second position, wherein the release actuator has a lower portion extending below the mount portion, the lower portion of the release actuator being connected with an operating element extending transversally relative to the infant stroller apparatus.

34. The infant stroller apparatus according to claim 33, wherein the mount portion is affixed with the second coupling hub.

35. The infant stroller apparatus according to claim 33, wherein the mount portion projects upward above the joint structure when the leg segment and the handle segment are locked in the unfolded state.

36. The infant stroller apparatus according to claim 33, wherein the release actuator is pivotally connected with the mount portion about a pivot axis that extends generally along a side of the infant stroller apparatus from a rear toward a front thereof.

37. The infant stroller apparatus according to claim 33, wherein the release actuator remains coupled with the mount portion when no seat is installed on the mount portion.

* * * * *